US008020876B2

(12) United States Patent
Lin

(10) Patent No.: US 8,020,876 B2
(45) Date of Patent: Sep. 20, 2011

(54) TOOL HAVING CLAMPING CHUCK

(76) Inventor: Hung Wei Lin, Taichung Hsien (TW)

( * ) Notice: Subject to any disclaimer, the term of this patent is extended or adjusted under 35 U.S.C. 154(b) by 1203 days.

(21) Appl. No.: 11/732,722

(22) Filed: Apr. 4, 2007

(65) Prior Publication Data

US 2008/0244913 A1 Oct. 9, 2008

(51) Int. Cl.
*B23B 31/22* (2006.01)

(52) U.S. Cl. ............................ 279/71; 279/81; 279/905

(58) Field of Classification Search .................... 279/66, 279/71, 72, 81, 905; 81/438; *B23B 31/22, B23B 31/171*
See application file for complete search history.

(56) References Cited

U.S. PATENT DOCUMENTS

| | | | | |
|---|---|---|---|---|
| 3,801,115 | A * | 4/1974 | Benjamin | 279/81 |
| 4,204,692 | A * | 5/1980 | Hoffman | 279/81 |
| 4,626,146 | A * | 12/1986 | Neumaier | 408/239 R |
| 4,691,929 | A * | 9/1987 | Neumaier et al. | 279/19.3 |
| 4,708,548 | A * | 11/1987 | Taylor et al. | 409/234 |
| 4,775,160 | A | 10/1988 | Manschitz | 279/74 |
| 4,775,269 | A * | 10/1988 | Brix | 408/239 R |
| 5,427,482 | A * | 6/1995 | Asano et al. | 408/240 |
| 5,575,071 | A * | 11/1996 | Phillips et al. | 30/392 |
| 5,946,810 | A * | 9/1999 | Hoelderlin et al. | 30/392 |
| 6,209,208 | B1 * | 4/2001 | Marinkovich et al. | 30/392 |
| 6,554,290 | B2 * | 4/2003 | Lin | 279/72 |
| 6,588,993 | B2 * | 7/2003 | Omi | 408/226 |
| 6,725,548 | B1 * | 4/2004 | Kramer et al. | 30/392 |
| 6,851,194 | B1 * | 2/2005 | Chen et al. | 30/392 |
| 7,040,023 | B2 * | 5/2006 | Nemazi et al. | 30/392 |
| 7,178,878 | B2 | 2/2007 | Rompel | 299/100 |
| 7,195,247 | B2 * | 3/2007 | Shu | 279/75 |
| 7,251,897 | B2 * | 8/2007 | Shuhua | 30/392 |
| 7,648,315 | B2 * | 1/2010 | Omi et al. | 408/57 |
| 7,665,216 | B2 * | 2/2010 | Yasheng | 30/392 |
| 7,871,080 | B2 * | 1/2011 | Marini et al. | 279/71 |
| 2009/0033042 | A1 * | 2/2009 | Rinner | 279/72 |
| 2009/0066040 | A1 * | 3/2009 | Teng et al. | 279/81 |

* cited by examiner

*Primary Examiner* — Eric A Gates
(74) *Attorney, Agent, or Firm* — Charles E. Baxley

(57) ABSTRACT

A tool includes a shank having an engaging hole for receiving one end of a tool member and having a number of orifices for receiving detents, a control ferrule rotatably engaged onto the shank and having a number of notches each of which includes a deeper portion for selectively receiving the detents and for disengaging the detents from the tool member and a shallower portion for selectively forcing and actuating the detents to engage with the tool member and to detachably couple the tool member to the shank, and a spring member may actuate the shallower portions of the notches of the control ferrule to engage with the detents and then to detachably couple the tool member to the shank.

12 Claims, 4 Drawing Sheets

TOOL HAVING CLAMPING CHUCK

BACKGROUND OF THE INVENTION

1. Field of the Invention

The present invention relates to a tool or chisel or punch or chopper, and more particularly to a chisel tool including a clamping chuck for replaceably or changeably attaching the tool bits or tool members and for quickly and solidly securing the tool bits or tool members to the chisel.

2. Description of the Prior Art

Typical tool devices or tool apparatuses, such as chisels or punches or choppers or percussion tools or driving tools or trimmers or impact tools or striking tools comprise a tip or tool bit or tool member formed or provided on one end thereof for acting onto the workpieces.

For example, U.S. Pat. No. 7,718,878 to Rompel discloses one of the typical chisels also comprise a shaft or shank or handle having a tip formed or provided on one end thereof for acting onto the workpieces.

However, the tip is solidly formed or provided or secured to the shank and may not be removed from the shank and also may not be changed to the other tips.

U.S. Pat. No. 4,775,160 to Manschitz discloses another typical clamping chuck for drill bits and chisel bits comprising a drill bit or chisel bit for inserting into a guide sleeve, and a number of clamping jaws radially and displaceably mounted in the guide sleeve for detachably securing the drill bits and chisel bits to the guide sleeve.

However, an enlarged block or apparatus is required to be formed and provided on one end of the guide sleeve such that the typical clamping chuck may include an increased volume that is adverse for storing or packaging and handling or operating or transportation purposes.

The present invention has arisen to mitigate and/or obviate the afore-described disadvantages of the conventional chisels or punches or choppers.

SUMMARY OF THE INVENTION

The primary objective of the present invention is to provide a chisel including a clamping chuck for replaceably or changeably attaching the tool bits or tool members and for quickly and solidly securing the tool bits or tool members to the chisel.

In accordance with one aspect of the invention, there is provided a tool comprising a shank including a first end having an engaging hole formed therein and having a noncircular cross section, and including a number of orifices formed in the first end of the shank and communicating with the engaging hole of the shank, a tool member including a first end engageable into the engaging hole of the shank, a number of detents slidably received in the orifices of the shank respectively and engageable into the engaging hole of the shank and selectively engageable with the tool member, a control ferrule rotatably engaged onto the first end of the shank, and including a number of notches formed in an inner peripheral shoulder thereof, and each notch of the control ferrule including a deeper portion for selectively receiving the detents and for allowing the detents to be selectively disengaged from the tool member and for allowing the tool member to be selectively disengaged from the shank, and each notch of the control ferrule including a shallower portion for selectively engaging with the detents and for forcing and actuating the detents to selectively engage with the tool member in order to detachably couple the tool member to the shank, and a biasing device for biasing and rotating the control ferrule relative to the shank to engage the shallower portions of the notches of the control ferrule with the detents and to actuate the detents to engage with the tool member so as to detachably couple the tool member to the shank.

The tool member includes a peripheral depression formed in the first end of the tool member for selectively receiving the detents and for selectively anchoring and securing the tool member to the shank. The orifices of the shank are preferably equally spaced from each other.

The shank includes a peripheral flange extended radially and outwardly from the first end of the shank for engaging with the peripheral flange of the shank and for limiting the control ferrule to move relative to the shank.

The control ferrule includes an inner peripheral recess formed in a front end portion thereof for forming the inner peripheral shoulder in the front end portion thereof and for engaging with the peripheral flange of the shank and for limiting the control ferrule to move relative to the shank and for preventing the control ferrule from being disengaged from the shank.

The shank includes a stop attached to the shank and engaged with the control ferrule for anchoring the control ferrule to the shank and for preventing the control ferrule from being rotated relative to the shank.

The control ferrule includes an inner peripheral channel formed in a rear end portion thereof for rotatably engaging with the stop and for rotatably anchoring the control ferrule to the shank and thus for preventing the control ferrule from being slid relative to the shank.

The shank includes a noncircular anchoring member formed on the shank, and the stop includes a noncircular opening formed therein for engaging with the noncircular anchoring member of the shank and for anchoring the stop to the shank and for preventing the stop from being rotated relative to the shank.

The shank includes a clamping member engaged with the shank and engaged with the stop for retaining the stop to the shank. The biasing device includes a spring member engaged with the control ferrule and engaged with the stop for biasing the control ferrule relative to the shank.

The spring member includes a first end engaged with the stop and a second end engaged with the control ferrule. The control ferrule includes a cavity formed therein for receiving the second end of the spring member. The stop includes at least two perforations formed therein.

The stop includes a number of apertures formed therein, and the first end of the spring member is selectively engageable into either of the apertures of the stop for adjusting the spring member to different spring biasing force that is applied against the control ferrule.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
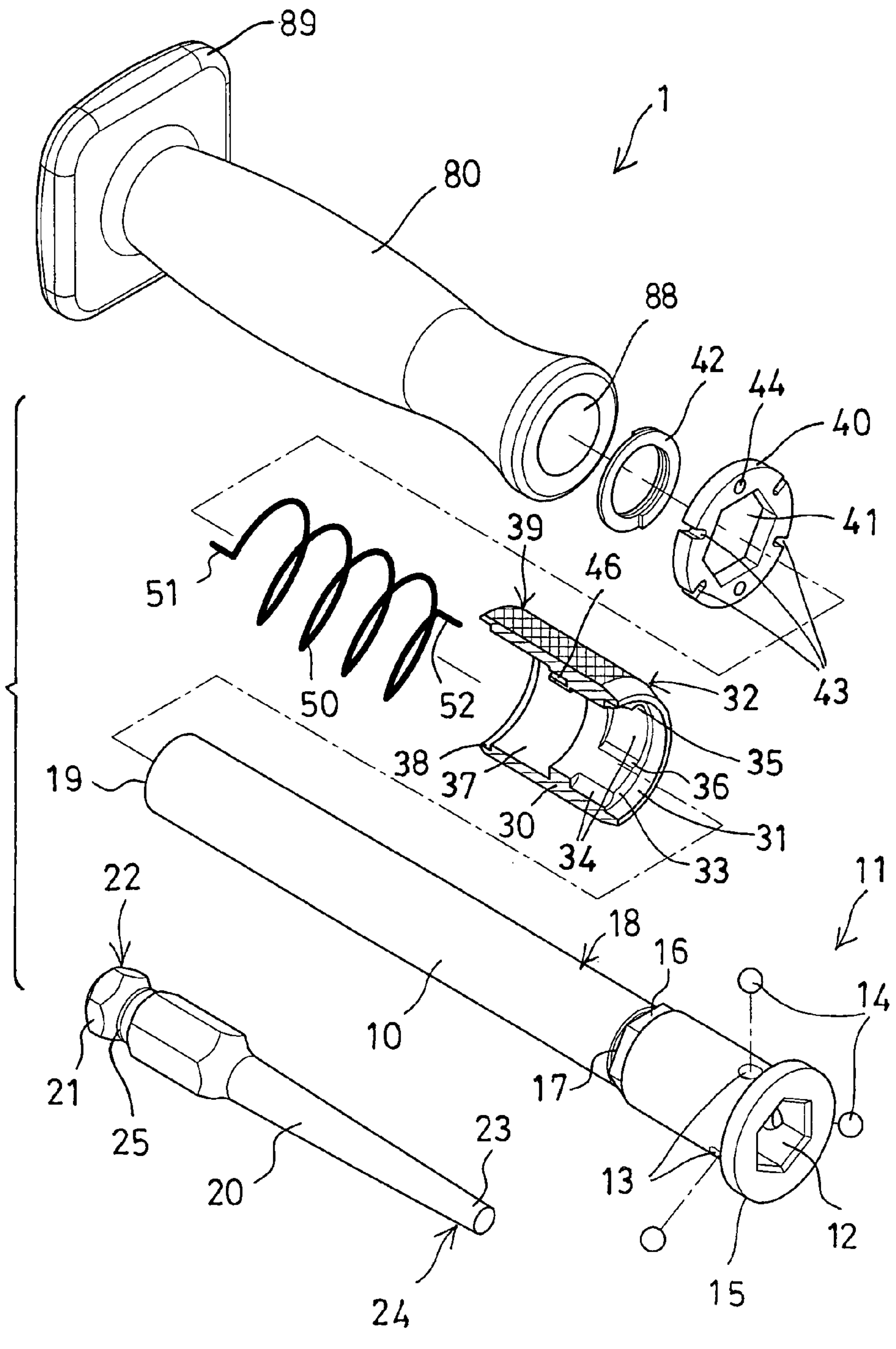
FIG. 1 is an exploded view of a tool in accordance with the present invention.
Figure 2:
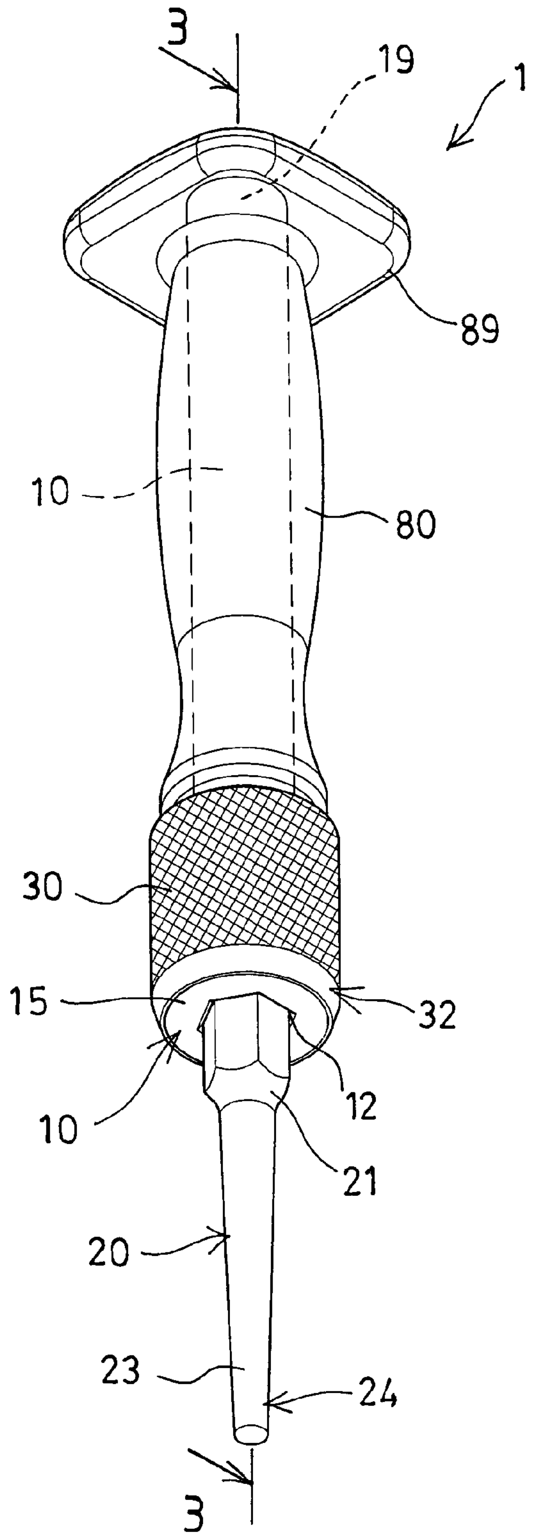
FIG. 2 is a perspective view of the tool.
Figure 3:
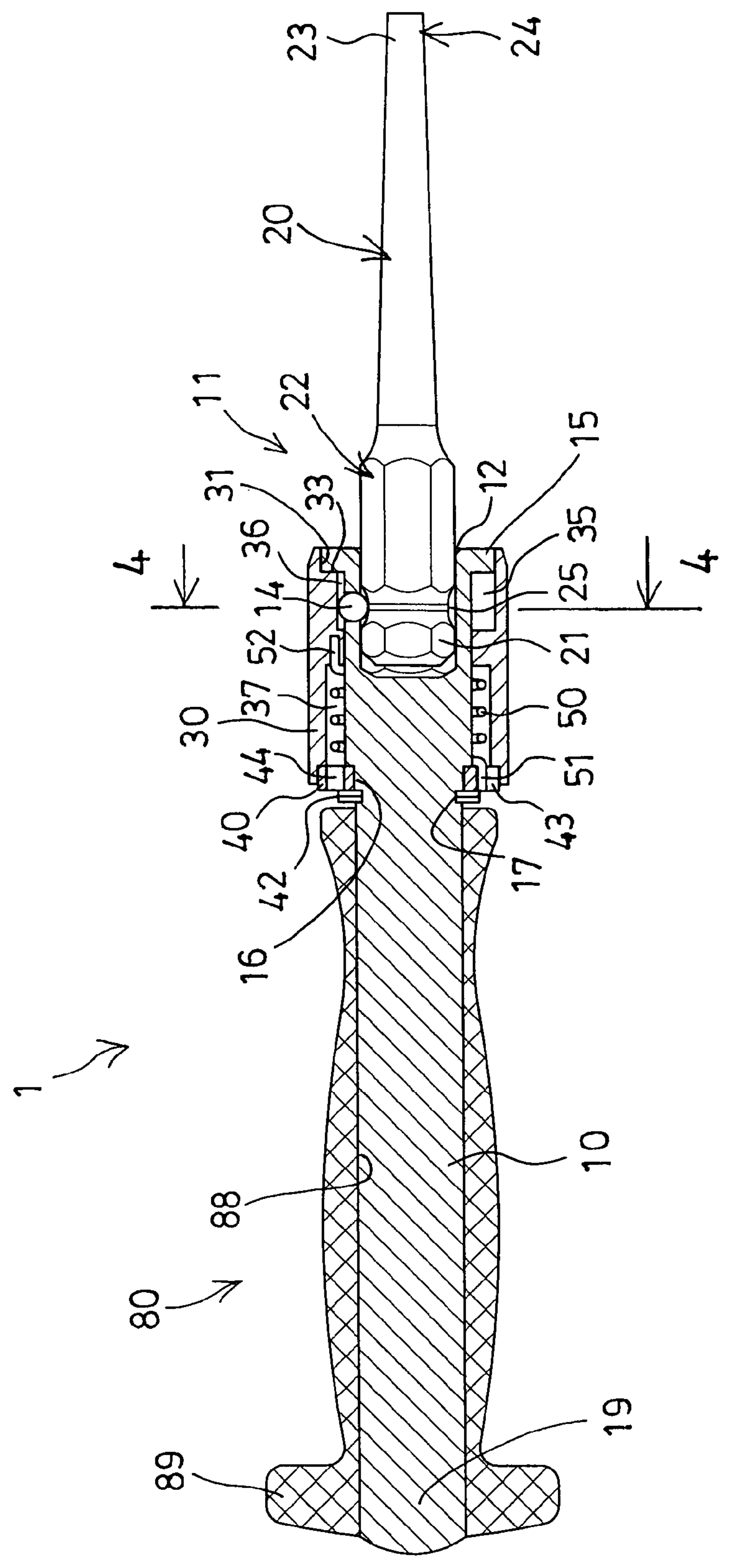
FIG. 3 is a partial cross sectional view of the tool taken along lines 3-3 of FIG. 2.

Referring to the drawings, and initially to FIGS. 1-3, a tool 1 in accordance with the present invention comprises a shaft or shank 10 including a first end or one end 11 having an engaging hole 12 formed therein and preferably having a noncircular cross section, such as a square or hexagonal cross section, for replaceably or changeably attaching or receiving a tool bit or tool member 20, such as a tool member 20 for a chisel or punch or chopper or percussion tool or driving tool or trimmer or impact tool or striking tool or other tools 1. For example, the tool member 20 includes an enlarged head 21 formed or provided on one end or first end 22 thereof and having a noncircular cross section for engaging into the corresponding noncircular engaging hole 12 of the shank 10 and for allowing the tool member 20 to be rotated or driven or operated by the shank 10.

The tool member 20 further includes a tool bit 23 formed or provided on the other end or second end 24 thereof for acting onto the workpieces (not shown), and further includes a peripheral depression 25 formed in the outer peripheral portion thereof, such as formed in the one end or first end 22 or the enlarged head 21 of the tool member 20. The shank 10 includes one or more (such as three) orifices 13 laterally formed in the first end 11 thereof and equally spaced from each other, and intersecting or communicating with the engaging hole 12 of the shank 10 each for slidably receiving a ball or detent 14 therein and for allowing the detents 14 to be selectively engaged into the engaging hole 12 of the shank 10 and engaged into the peripheral depression 25 of the tool member 20 in order to selectively or replaceably or changeably or detachably attach or couple the tool member 20 to the shank 10.

The detents 14 may also be selectively disengaged from the peripheral depression 25 of the tool member 20 for allowing the tool member 20 to be selectively detached or disengaged from the shank 10 and thus for allowing the tool members 20 to be easily and quickly replaced or changed with the other ones. The shank 10 includes a peripheral flange 15 extended radially and outwardly therefrom, such as extended radially and outwardly from the first end 11 of the shank 10, and includes a noncircular anchoring portion or member 16 and an outer peripheral groove 17 formed therein, such as formed in the outer peripheral portion and/or in the middle portion 18 thereof. A handle or hand grip 80 may include a bore or chamber 88 formed therein for receiving the other end portion 19 of the shank 10, and for solidly securing or attaching the hand grip 80 to the shank 10.

For example, the hand grip 80 may be solidly secured or attached onto the shank 10 with latches or fasteners or keys (not shown), or by molding processes for allowing the shank 10 to be worked or actuated or operated with the hand grip 80. It is preferable that the hand grip 80 is made of soft or resilient materials, such as rubber, plastic or other synthetic materials, for allowing the hand grip 80 to be comfortably and frictionally held or grasped by the users, and thus for allowing the shank 10 and the tool members 20 to be easily and effectively moved or actuated or operated with the hand grip 80. The hand grip 80 may further include an enlarged member 89 extended radially and outwardly therefrom, such as extended radially and outwardly from the rear end portion thereof for allowing the hand grip 80 to be effectively held or grasped by the users.

Figure 5:
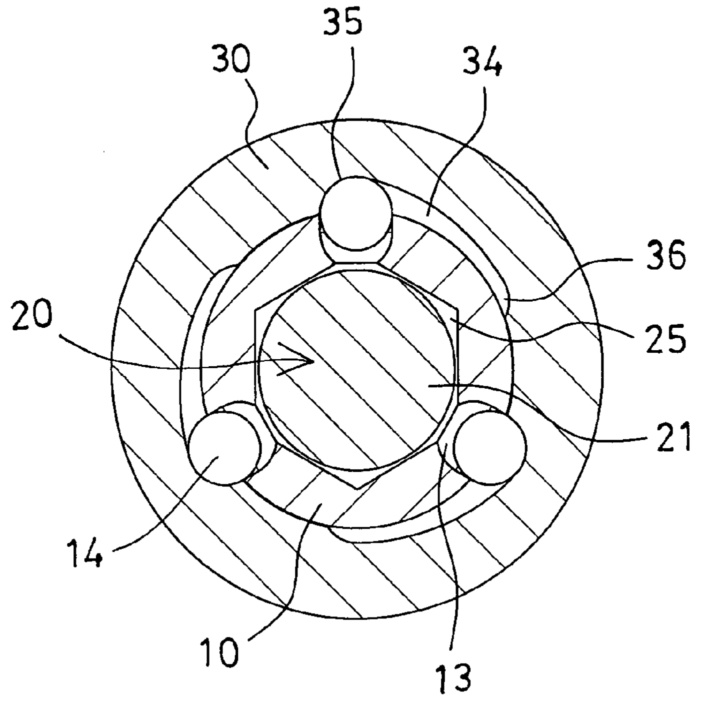
FIG. 5 is a cross sectional view similar to FIG. 4, illustrating the operation of the tool.

A barrel or control ferrule 30 is rotatably and slidably engaged onto the shank 10, such as engaged onto the first end 11 of the shank 10, and includes an inner peripheral recess 31 formed in one end or front end portion 32 thereof for forming an inner peripheral shoulder 33 in the front end portion 32 thereof and for engaging with the peripheral flange 15 of the shank 10, and thus for limiting the control ferrule 30 to slide relative to the shank 10 and also for preventing the control ferrule 30 from being disengaged from the shank 10. The control ferrule 30 includes one or more (such as three) notches 34 formed in the inner peripheral shoulder 33 thereof and equally spaced from each other, and each notch 34 of the control ferrule 30 includes a deeper end or portion 35 for selectively receiving the detents 14 (FIG. 5) and for allowing the detents 14 to be selectively disengaged from the peripheral depression 25 of the tool member 20.

Figure 4:
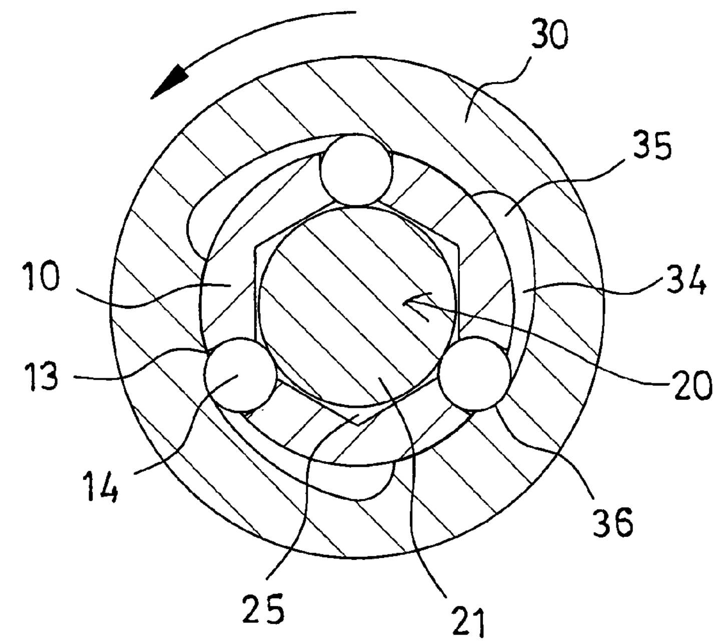
FIG. 4 is a cross sectional view of the tool taken along lines 4-4 of FIG. 3.

When the detents 14 are received in the deeper portions 35 of the notches 34 of the control ferrule 30 and/or when the detents 14 are disengaged from the peripheral depression 25 of the tool member 20, the tool members 20 may be selectively detached or disengaged from the shank 10 and may be easily and quickly replaced or changed with the other ones. The notches 34 of the control ferrule 30 each further include a shallower end or portion 36 for selectively engaging with the detents 14 (FIG. 4) and for forcing or actuating the detents 14 to selectively move or engage into the peripheral depression 25 of the tool member 20 in order to solidly and selectively or replaceably or changeably or detachably attach or couple the tool member 20 to the shank 10. The control ferrule 30 further includes an inner peripheral space 37 and an inner peripheral channel 38 formed in such as the other end or rear end portion 39 thereof.

A stop 40 includes an opening 41 formed therein, such as formed in the inner or center portion thereof and having a noncircular cross section, such as a square or hexagonal cross section, for selectively engaging with the noncircular anchoring member 16 of the shank 10 and for selectively anchoring the control ferrule 30 to the shank 10 and thus for preventing the control ferrule 30 from being rotated relative to the shank 10, a spring and/or clamping member 42 is engaged with the outer peripheral groove 17 of the shank 10 and engaged with the stop 40 for retaining the stop 40 in engagement with the noncircular anchoring member 16 of the shank 10 and thus for anchoring or securing the stop 40 to the shank 10.

It is preferable that the stop 40 is rotatably engaged into the inner peripheral channel 38 of the control ferrule 30 for anchoring the control ferrule 30 to the shank 10 and for preventing the control ferrule 30 from sliding relative to the shank 10 and thus for allowing the control ferrule 30 to be only rotated relative to the shank 10. The stop 40 includes one or more apertures 43 and one or more perforations 44 formed therein. A spring member 50, such as a coil spring member 50 is received or engaged within the inner peripheral space 37 of the control ferrule 30, and includes one end 51 bent or folded therefrom for engaging into either of the apertures 43 of the stop 40, and another end 52 also bent or folded therefrom for engaging into a cavity 46 (FIG. 1) that is formed in the control ferrule 30 for allowing the spring member 50 to be engaged between the control ferrule 30 and the shank 10 and the stop 40 and in order to apply a spring biasing force to the control ferrule 30 or against the control ferrule 30.

For example, the spring member 50 may bias and rotate the control ferrule 30 relative to the shank 10 in order to engage the shallower portions 36 of the control ferrule 30 with the detents 14 (FIG. 4) and to force or actuate the detents 14 to move or engage into the peripheral depression 25 of the tool member 20 so as to solidly and selectively or replaceably or changeably or detachably attach or couple the tool member 20 to the shank 10. When the control ferrule 30 is rotated relative to the shank 10 against the spring member 50 until the deeper portions 35 of the notches 34 of the control ferrule 30 are aligned with the detents 14, the detents 14 may be received and engaged into the deeper portions 35 of the notches 34 of the control ferrule 30 and may be disengaged from the peripheral depression 25 of the tool member 20, such that the tool members 20 may be selectively detached or disengaged from the shank 10 and may be easily and quickly replaced or changed with the other ones.

It is to be noted that the one end 51 of the spring member 50 may be selectively engaged into either of the apertures 43 of the stop 40 for allowing the spring biasing force of the spring member 50 applied to or against the control ferrule 30 may be adjusted to different spring biasing forces or values. Alternatively, a nipple tool (not shown) may include two tips for engaging into the perforations 44 of the stop 40 and for rotating the stop 40 and for twisting the spring member 50 relative to the shank 10 and the control ferrule 30, and also for allowing the spring member 50 to be adjusted to different spring biasing forces or values for applying to or against the control ferrule 30.

It is further to be noted that the shallower portions 36 of the control ferrule 30 may be caused to engage with the detents 14 and to actuate the detents 14 to engage into the peripheral depression 25 of the tool member 20 when the stop 40 and the spring member 50 are rotated and twisted relative to the shank 10 for allowing the spring member 50 to be adjusted to different spring biasing forces or values for applying to or against the control ferrule 30. The spring member 50 may thus be formed or acted as a spring biasing means or device for biasing and rotating the control ferrule 30 relative to the shank 10 in order to engage the shallower portions 36 of the control ferrule 30 with the detents 14 and to actuate the detents 14 to engage into the peripheral depression 25 of the tool member 20 and so as to detachably couple or secure the tool member 20 to the shank 10.

Accordingly, the tool in accordance with the present invention includes a clamping chuck for replaceably or changeably attaching the tool bits or tool members and for quickly and solidly securing the tool bits or tool members to the tool.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tool comprising:

a shank including a first end having an engaging hole formed therein and having a noncircular cross section, and including a plurality of orifices formed in said first end of said shank and communicating with said engaging hole of said shank, said shank including a stop attached to said shank, said shank including a noncircular anchoring member formed on said shank, and said stop including a noncircular opening formed therein for engaging with said noncircular anchoring member of said shank and for anchoring said stop to said shank and for preventing said stop from being rotated relative to said shank, a tool member including a first end engageable into said engaging hole of said shank, a plurality of detents slidably received in said orifices of said shank respectively and engageable into said engaging hole of said shank and selectively engageable with said tool member, a control ferrule rotatably engaged onto said first end of said shank, and including a plurality of notches formed in an inner peripheral shoulder thereof, and each notch of said control ferrule including a deeper portion for selectively receiving said detents and for allowing said detents to be selectively disengaged from said tool member and for allowing said tool member to be selectively disengaged from said shank, and each notch of said control ferrule including a shallower portion for selectively engaging with said detents and for forcing and actuating said detents to selectively engage with said tool member in order to detachably couple said tool member to said shank, said stop of said shank being engaged with said control ferrule for anchoring said control ferrule to said shank and for preventing said control ferrule from being rotated relative to said shank, and means for biasing and rotating said control ferrule relative to said shank to engage said shallower portions of said notches of said control ferrule with said detents and to actuate said detents to engage with said tool member so as to detachably couple said tool member to said shank.

2. The tool as claimed in claim 1, wherein said tool member includes a peripheral depression formed in said first end of said tool member for selectively receiving said detents and for selectively anchoring and securing said tool member to said shank.

3. The tool as claimed in claim 1, wherein said orifices of said shank are equally spaced from each other.

4. The tool as claimed in claim 1, wherein said shank includes a peripheral flange extended radially and outwardly from said first end of said shank for engaging with said peripheral shoulder of said control ferrule and for limiting said control ferrule to move relative to said shank.

5. The tool as claimed in claim 4, wherein said control ferrule includes an inner peripheral recess formed in a front end portion thereof for forming said inner peripheral shoulder in said front end portion thereof and for engaging with said peripheral flange of said shank and for limiting said control ferrule to move relative to said shank and for preventing said control ferrule from being disengaged from said shank.

6. The tool as claimed in claim 1, wherein said control ferrule includes an inner peripheral channel formed in a rear end portion thereof for rotatably engaging with said stop and for anchoring said control ferrule to said shank and for preventing said control ferrule from sliding relative to said shank.

7. The tool as claimed in claim 1, wherein said biasing means includes a spring member engaged with said control ferrule and engaged with said stop for biasing said control ferrule relative to said shank.

8. The tool as claimed in claim 7, wherein said spring member includes a first end engaged with said stop and a second end engaged with said control ferrule.

9. The tool as claimed in claim 8, wherein said control ferrule includes a cavity formed therein for receiving said second end of said spring member.

10. A tool comprising:

a shank including a first end having an engaging hole formed therein and having a noncircular cross section, and including a plurality of orifices formed in said first end of said shank and communicating with said engaging hole of said shank, said shank including a stop attached to said shank, said shank including a clamping member engaged with said shank and engaged with said stop for retaining said stop to said shank, a tool member including a first end engageable into said engaging hole of said shank, a plurality of detents slidably received in said orifices of said shank respectively and engageable into said engaging hole of said shank and selectively engageable with said tool member, a control ferrule rotatably engaged onto said first end of said shank, and including a plurality of notches formed in an inner peripheral shoulder thereof, and each notch of said control ferrule including a deeper portion for selectively receiving said detents and for allowing said detents to be selectively disengaged from said tool member and for allowing said tool member to be selectively disengaged from said shank, and each notch of said control ferrule including a shallower portion for selectively engaging with said detents and for forcing and actuating said detents to selectively engage with said tool member in order to detachably couple said tool member to said shank, said stop of said shank being engaged with said control ferrule for anchoring said control ferrule to said shank and for preventing said control ferrule from being rotated relative to said shank, and means for biasing and rotating said control ferrule relative to said shank to engage said shallower portions of said notches of said control ferrule with said detents and to actuate said detents to engage with said tool member so as to detachably couple said tool member to said shank.

11. A tool comprising:

a shank including a first end having an engaging hole formed therein and having a noncircular cross section, and including a plurality of orifices formed in said first end of said shank and communicating with said engaging hole of said shank, said shank including a stop attached to said shank, a tool member including a first end engageable into said engaging hole of said shank, a plurality of detents slidably received in said orifices of said shank respectively and engageable into said engaging hole of said shank and selectively engageable with said tool member, a control ferrule rotatably engaged onto said first end of said shank, and including a plurality of notches formed in an inner peripheral shoulder thereof, and each notch of said control ferrule including a deeper portion for selectively receiving said detents and for allowing said detents to be selectively disengaged from said tool member and for allowing said tool member to be selectively disengaged from said shank, and each notch of said control ferrule including a shallower portion for selectively engaging with said detents and for forcing and actuating said detents to selectively engage with said tool member in order to detachably couple said tool member to said shank, said stop of said shank being engaged with said control ferrule for anchoring said control ferrule to said shank and for preventing said control ferrule from being rotated relative to said shank, and biasing means including a spring member engaged with said control ferrule and engaged with said stop for biasing and rotating said control ferrule relative to said shank to engage said shallower portions of said notches of said control ferrule with said detents and to actuate said detents to engage with said tool member so as to detachably couple said tool member to said shank, said spring member includes a first end engaged with said stop and a second end engaged with said control ferrule, said stop including a plurality of apertures formed therein, and said first end of said spring member being selectively engageable into any of said apertures of said stop for adjusting said spring member to different spring biasing force against said control ferrule.

12. A tool comprising:

a shank including a first end an engaging hole formed therein and having a noncircular cross section, and including a plurality of orifices formed in said first end of said shank and communicating with said engaging hole of said shank, said shank including a stop attached to said shank, a tool member including a first end engageable into said engaging hole of said shank, a plurality of detents slidably received in said orifices of said shank respectively and engageable into said engaging hole of said shank and selectively engageable with said tool member, a control ferrule rotatably engaged onto said first end of said shank, and including a plurality of notches formed in an inner peripheral shoulder thereof, and each notch of said control ferrule including a deeper portion for selectively receiving said detents and for allowing said detents to be selectively disengaged from said tool member and for allowing said tool member to be selectively disengaged from said shank, and each notch of said control ferrule including a shallower portion for selectively engaging with said detents and for forcing and actuating said detents to selectively engage with said tool member in order to detachably couple said tool member to said shank, said stop of said shank being engaged with said control ferrule for anchoring said control ferrule to said shank and for preventing said control ferrule from being rotated relative to said shank, and biasing means including a spring member engaged with said control ferrule and engaged with said stop for biasing and rotating said control ferrule relative to said shank to engage said shallower portions of said notches of said control ferrule with said detents and to actuate said detents to engage with said tool member so as to detachably couple said tool member to said shank, said spring member includes a first end engaged with said stop and a second end engaged with said control ferrule, said stop including at least two perforations formed therein.

* * * * *